United States Patent [19]

Marella et al.

[11] Patent Number: 5,750,459

[45] Date of Patent: May 12, 1998

[54] SOL-GEL PROCESS FOR OBTAINING PURE AND MIXED OXIDE ZIRCONIA SPHERES, MICROSPHERES AND WASHCOATS, USEFUL AS CATALYSTS OR CATALYST SUPPORTS

[75] Inventors: Marcello Marella; Letizia Meregalli; Michele Tomaselli, all of Venice, Italy

[73] Assignee: Enirisorse S.p.A., Italy

[21] Appl. No.: 570,684

[22] Filed: Dec. 11, 1995

[30] Foreign Application Priority Data

Dec. 21, 1994 [IT] Italy .................. MI94A2588

[51] Int. Cl.⁶ .................. B01J 13/00; B01J 23/63; B01J 35/08; B01J 101/50
[52] U.S. Cl. .................. 502/304; 252/315.01; 252/315.7; 501/12; 502/8; 502/349; 502/351
[58] Field of Search .................. 252/315.01, 315.7; 501/12; 502/8, 349, 351, 304

[56] References Cited

U.S. PATENT DOCUMENTS

| | | | |
|---|---|---|---|
| 3,518,050 | 6/1970 | Woodhead | 252/315.01 X |
| 3,776,987 | 12/1973 | Grimes et al. | 252/315.3 X |
| 4,637,995 | 1/1987 | DeAngelis et al. | 502/351 X |
| 5,015,617 | 5/1991 | Ohata et al. | 502/349 X |
| 5,217,938 | 6/1993 | Reinalda et al. | 502/349 X |
| 5,420,086 | 5/1995 | Brandau et al. | 501/103 |

FOREIGN PATENT DOCUMENTS

92/19538 11/1992 WIPO.

*Primary Examiner*—Richard D. Lovering
*Attorney, Agent, or Firm*—Bell, Boyd & Lloyd

[57] ABSTRACT

This invention relates to a process for obtaining pure or mixed oxide zirconia spheres, microspheres or washcoats consisting of:

preparing a zirconium solution in water at a concentration, formally expressed as $ZrO_2$, equal or lower than 400 g/l, starting from a basic zirconium carbonate additioned of conc. nitric acid up to a molar ratio $[NO_3^-]/[Zr^{4+}]$ between 0.8 and 1.1, and eventually preparing one or more solutions of the other oxides when necessary;

preparing a sol of zirconium, eventually mixed to other metals, by a thickening agent and, in the case of spheres and microspheres, of a surface active agent too;

dripping the sol into an alkaline gelation bath for obtaining gel spheres or microspheres, or sucking the sol into the honeycomb channels in order to obtain the washcoats, with subsequent gelation with gaseous ammonia;

ageing the so obtained gel;

rinsing with water down to pH=9–10, only in the case of gel spheres or microspheres;

drying and calcining.

11 Claims, 1 Drawing Sheet

SOL-GEL PROCESS FOR OBTAINING PURE AND MIXED OXIDE ZIRCONIA SPHERES, MICROSPHERES AND WASHCOATS, USEFUL AS CATALYSTS OR CATALYST SUPPORTS

FIELD OF THE INVENTION

The invention concerns a process for obtaining pure or mixed oxide zirconia spheres, microspheres or washcoats, useful as catalysts or catalyst supports.

BACKGROUND OF THE INVENTION

Zirconia can be used as a catalyst with specific catalytic action for some reactions like isomerization of 1-butene, dehydration of alcohols, hydrogenation of dienes by $H_2$ and hydrogen donor molecules like cyclohexadiene, hydrogenation of carboxylic acids, of carbon monoxide, etc. These behaviours are due to the simultaneous presence of weakly acid sites and weakly basic sites on $ZrO_2$ surface.

Furthermore and above all, $ZrO_2$ is an efficient catalyst support for chromium oxide, copper oxide, Pd, Pt, Rh for processes like the oxidation of CO, the hydrogenation of CO, the removal of $SO_2$ and $NO_x$ from flue gases, propane oxidation, combustion of low-temperature fuel gases and low-temperature steam reforming. The catalyst supports can be prepared by traditional ceramic technologies, e.g. granulation, pelletization, extrusion or spray drying. The drawbacks of these methods are nonhomogeneities of the compositions particularly when doping agents are present in a low content, e.g. Ce, La, Nd, etc.

Other techniques of preparation of the supports involve chemical methods and particularly precipitation techniques of zirconyl nitrate or chloride solutions in $NH_3$, NaOH, or KOH solutions. Very fine powders are obtained but they are useless from the practical point of view unless the above techniques are utilized. Finally, several alkoxide sol-gel techniques for the preparation of $ZrO_2$ are reported in the literature. They consist, respectively, in the hydrolysis and polycondensation of zirconium n-propoxide under acidic conditions in an alcoholic medium, of zirconium tetra-n-propoxide in the presence of long-chain carboxylic acids, of zirconium n-propoxide and acetic acid, acetylacetone and isopropanol. With these methods spherical zirconia particles with diameters 0.1–2.5 m were obtained. These powders can be processed by spray-drying.

The drawbacks of these sol-gel methods are the cost of the reagents, their stability and again the fine grain size of the powders, with the impossibility of obtaining supports with diameters 1–3 mm and suitable shape, e.g. spherical. In fact, these technologies have been developed for structural ceramics applications rather than for catalyst carriers.

A sol-gel process for $ZrO_2$ sphere and microsphere preparation was disclosed during the Sixth International Symposium "Scientific Bases for the Preparation of Heterogeneous Catalysts" in Louvain-la-Neuve (Sep. 5–8, 1994) by the communication "Zirconia spheres and microspheres by gel supported precipitation" (M. Marella, M. Tomaselli, L. Meregalli, M. Battagliarin, P. Gerontopoulos, F. Pinna, M. Signoretto, G. Strukul). The sol was prepared by denitration of a $ZrO(NO_3)_2 2H_2O$ solution by solvent extraction with an alkyl tertiary amine diluted in Solvesso 100™. The denitration had to be extended to a molar ratio $[NO_3]^-/[Zr^{4+}]=0.95$ and the extractant was regenerated by a continuous process. Furthermore, the process required the azeotropic dehydration of the gel spheres preferentially by toluene.

This process had its major drawback in the utilization of the solvent extraction stage for lowering the nitrate ion concentration. The control of the nitrate content derives from the necessity of limiting their evolution during calcination with the risk of cracks for the spheres, apart from environmental considerations.

Even though the tertiary amine is regenerated, the process on the whole is considerably complicated by this stage in terms of the equipments required for the extraction, the cost of the amine, its sensitivity to the oxidation and its losses.

We have found a simplified sol-gel technique which can be applied to a wide variety of materials with minor modifications to the procedures and allows to obtain spheres or microspheres in a broad range of diameters.

Furthermore, the azeotropic dehydration stage, utilized in the procedure disclosed in Louvain, is normally no longer necessary with the new procedure herein disclosed. This represents a noteworthy advantage in terms of simplification of the preparation flow sheet, of the equipments required, and of energy and manpower costs.

BRIEF DESCRIPTION OF THE DRAWING

The invention will now be described with reference to the sole FIGURE which depicts near perfect close packing of spheres described in example 5.

The procedure for obtaining pure or mixed oxide zirconia spheres, microspheres or washcoats, matter of the present invention, consists of:

Figure 1:
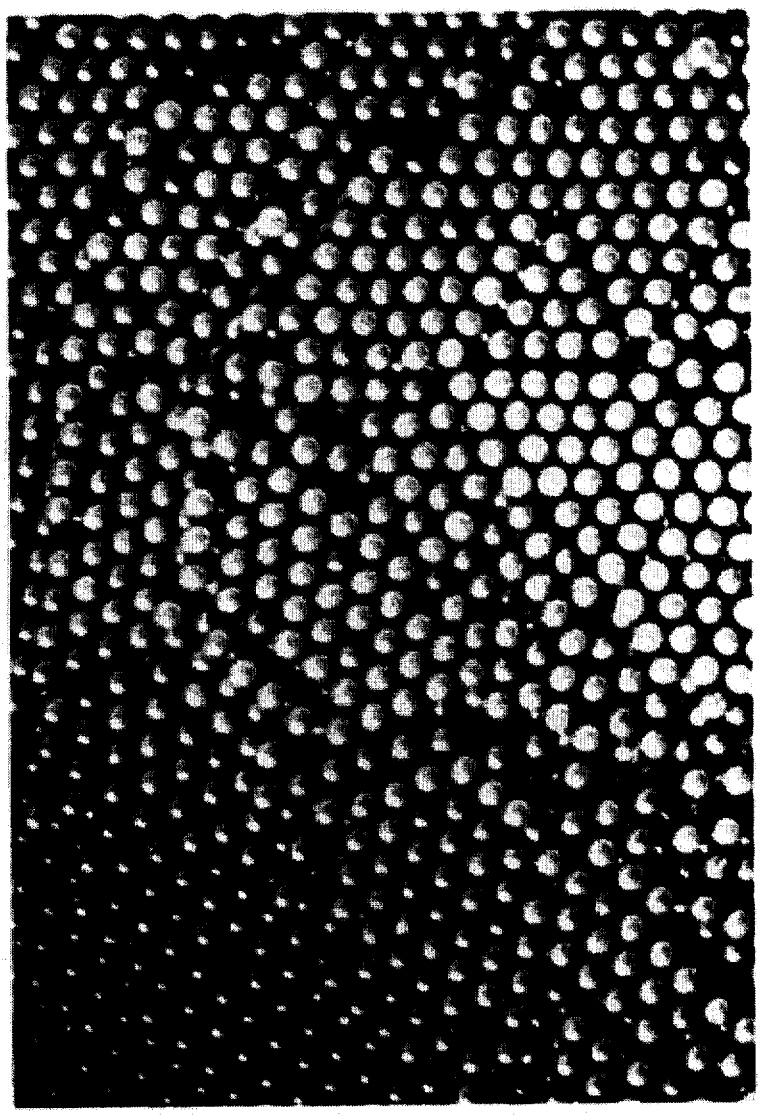

DESCRIPTION OF THE INVENTION preparing a zirconium solution in water at a concentration, formally expressed as $ZrO_2$, equal or lower than 400 g/l, starting from a basic zirconium carbonate additioned of conc. nitric acid up to a molar ratio $[NO_3^-]/[Zr^{4+}]$ between 0.8 and 1.1, and eventually preparing one or more solutions of the other oxides when necessary;

preparing a sol of zirconium, eventually mixed to other metals, by a thickening agent and, in the case of spheres and microspheres, of a surface active agent too;

dripping the sol into an alkaline gelation bath for obtaining gel spheres or microspheres, or sucking the sol into the honeycomb channels in order to obtain the washcoats, with subsequent gelation with gaseous ammonia;

ageing the so obtained gel;

rinsing with water down to pH=9–10, only in the case of gel spheres or microspheres;

drying and calcining.

With the claimed procedure we can obtain spheres with diameters in the range 0.5–5 mm, microspheres with diameters in the range 1 μm–0.5 mm and washcoats with thickness lower than 200 m.

The oxynitrate solution, obtained during the first stage of the process by dissolution in nitric acid, is surely preferred with respect to a oxychloride one, since Cl remaining as an impurity in the final product, as a consequence of the not fully achieved gelation conversion:

or insufficient washing of the beads, may adversely affect surface properties.

So, a commercial zirconium carbonate basic $2ZrO_2CO_2H_2O$ can more advantageously be used as starting raw material. The typical $ZrO_2$ content is 40%. The content of impurities which can strongly modify the texture properties of final products is rather low: $SO_4^{2-}<0.2\%$, $Cl^-<0.3\%$, $Fe<10$ ppm, $Na^+<0.2\%$, $Ti^{4+}<25$ ppm, $SiO_2\sim130$ ppm. From the zirconium carbonate a sol of zirconium oxynitrate can be obtained by dissolution in concentrated nitric acid.

By simple dissolution of the basic zirconium carbonate in conc. nitric acid, we can get a $[NO_3]^-/[Zr^{4+}]$ ratio between 0.8 and 1.1, preferentially towards the lower ratio.

The dissolution is carried out by addition of the moist filter cake under strong stirring of the acid. When almost all the zirconium carbonate has been added, the temperature is increased to about 60° C., while adding a certain amount of water. This operation accelerates $CO_2$ evolution from the solution. In the end the solution is brought to volume.

As previously said, the maximum allowed $ZrO_2$ formal concentration is 400 g/l, after that the risk of spontaneous gelling of the solution is noteworthy.

The thickening agent is preferentially chosen among solutions of methylcellulose, hydroxypropyl methylcellulose, hydroxybutyl methylcellulose, polyvinyl alcohol of molecular weight 15,000–186,000, dextrin or dextran.

The non ionic surface active agent can be, for instance, the iso-octyl-phenoxy-polyethoxy-ethanol. The surfactant is not used for preparing the washcoats.

The sol composition in terms of oxides is preferentially selected among:

$ZrO_2$;

$ZrO_2$—$Y_2O_3$, with $Y_2O_3$ in the range 1–15% wt.;

$ZrO_2$—$Al_2O_3$, with $Al_2O_3$ in the range 1–30% wt.;

$ZrO_2$—$Al_2O_3$—$CuO$, with $Al_2O_3$ in the range 1–30% wt. and $CuO$ in the range 1–20% wt.

$ZrO_2$—$Al_2O_3$—$CeO_2$, with $Al_2O_3$ in the range 1–30% wt. and $CeO_2$ in the range 5–30% wt and containing also a catalytically effective amount of rhodium and/or platinum and/or palladium.

Depending on the different ranges of sphere diameters, which one wishes to obtain, dripping and atomization are carried out following several methods reported in the literature, and particularly in the patent applications IT-20167A/81 and IT-20168A/81, respectively for dripping and atomization.

As to the gelation bath, solutions of ammonia, either in water or in alcohol, or hydrazine or hydroxylamine or hexamethylenetetramine or monoethanolamine or tetramethylammonium hydroxide or tetraethylammonium hydroxide or tetrabutylammonium hydroxide, either in water or in alcohol, or gaseous ammonia can be utilized: usually ammonia solutions in water are preferred, and particularly conc. ammonia (about 30%) diluted 1:1 or 1:2 by volume.

In the case of alcoholic solutions, the alcohol is preferentially selected among methyl, ethyl, n-propyl or isopropyl alcohol. Only for specific embodiment of the present invention, like that reported in the example 5 where ammonia cannot be used owing to its complexing properties towards copper ion, other more expensive gelation baths are used.

In this case it was found that tetramethylammonium hydroxide diluted in methyl alcohol was able to cogelate together zirconium, aluminum and copper ions, giving a perfectly homogeneous aluminum and copper distributions within the zirconium matrix, as determined by EDS mappings. This composition has proven an efficient sorbent catalyst for the simultaneous removal of $SO_2$ and $NO_x$ from flue gas.

In ordinary precipitation zirconium hydroxide has a zirconium polycation structure of α-type or β-type or γ-type depending on the ageing. Usually, 4 zirconium ions are linked together by bridged hydroxyl groups (α-type) or oxygen groups (γ-type). In our case, the situation is more complicated and the gelation is most probably brought about by zirconium polycation structures linked by hydrogen bonds of their terminal hydroxyl groups to —OH, —OCH$_3$ or —CH$_2$OCH$_3$ groups of methylcellulose chains.

Normally, the ageing time is low enough as not to slow down the whole process (typical ageing times of 30 minutes or even less are used).

After gelation, the spheres or the microspheres are washed down to pH 9–10 and afterwards dried and calcined with a single step firing schedule, preferentially at 2 K/min. up to the temperature required for obtaining the desired texture properties.

The azeotropic dehydration stage, reported in the process disclosed in Louvain, is found unnecessary for most of materials shown in the following examples. This represents a considerable advantage, as outlined above.

It is important to note that in general with this process high surface area, unimodal pore size distribution in the mesopore range (1–100 nm) and very good crush strength and attrition resistance are obtained.

In particular, cogel compositions of mixed oxide $ZrO_2$—$Al_2O_3$ with alumina variable in the range 1–10% wt. show enhanced properties in terms of:

shifting the temperature of crystallization of $ZrO_2$ from 410° C. to 660° C. (for 10% wt.), as determined by DTA;

increasing the crush strength;

increasing the surface area at the various temperatures of calcination.

High surface area $ZrO_2$ microspheres can be useful for fluidized bed reactors. Furthermore, these microspheres can be further processed by granulation, pelletization or, even better, by extrusion, in order to obtain larger dimensions catalyst supports for fixed bed reactors.

The catalysts, if not directly prepared as shown for instance in example 5, can be prepared from the support with one of the methods reported in the literature, by impregnation of gel with precursor metal salts solutions, impregnation of the xerogel or by the "incipient wetness method" on calcined supports.

Moreover, sol-gel compositions useful as washcoats of honeycomb monoliths of catalytic converters can be prepared similarly to what was previously described for the spheres and the microspheres.

Instead of dripping, the sol is sucked into the honeycomb channels. In order to assure a better wettability, the sol composition is modified and a solution of zirconium acetate is preferred (example 6).

The excess sol is blown out with air. Then the coating is made to gel putting the honeycomb into a cabinet with flowing gaseous ammonia. The honeycomb is finally dried and calcined at 500° C. at 2K/min.

The washcoat shows good adhesion on the walls and high surface area at the temperature of possible utilization (800°–900° C.). In comparison to the known art and particularly to the patent application WO-92/05861, this method has the following advantages:

the refractory oxides, $ZrO_2$, $Al_2O_3$, $CeO_2$ and the precious metals are mixed on atomic scale, so washcoat composition is much more homogeneous and the single components much more catalytically effective;

the washcoat preparation procedure is extremely simplified (single-step) without passing through stages of milling of powders and multiple impregnation steps, as suggested in the examples 1 and 3 of the patent application WO-92/05861;

cerium, directly incorporated in the sol composition, helps to prevent catalyst sintering and the redox couple $Ce^{3+} \leftrightarrows Ce^{4+}$ may be stabilized against deactivation.

Moreover, similar compositions with the viscosity properly tuned can be dripped into spheres of carefully controlled diameters (e.g. 1.7±0.1 mm) as reported in example 7, gelled, rinsed with water to pH 9, dried and impregnated of the precious metal catalysts by one of the several methods reported in the literature.

Alternatively, the precious metal can be directly incorporated into the sol composition, as reported in example 6. The gelation bath is here again a solution of tetramethylammonium hydroxide in methyl alcohol, since with ammonia cerium would not cogelate owing to the formation of water soluble compounds, like $(NH_4)_2Ce(NO_3)_6$ or $2NH_4NO_3Ce(NO_3)_3 4H_2O$.

These spheres may be useful in a catalytic converter.

In comparison to the honeycomb converter, the exhaust gases are here forced to penetrate the unimodal mesopore structure with increased contact time and improved efficiency.

At the same time clogging of the catalytic converter is delayed by the perfect diameter control of the spheres, which in the hcp (hexagonal close packing) occupy at the most the 65% volume available.

Herein we show some examples, which by no means should be meant as limiting of the invention.

EXAMPLE 1

Pure zirconia spherical catalyst supports

Preparation of a zirconium solution in $H_2O$, with a formal concentration of 300 g/l as $ZrO_2$ and with $[NO_3]^-/[Zr^{4+}]$ ratio=0.8:

| 7.5 Kg | $2ZrO_2CO_2H_2O$ (zirconium basic carbonate) |
|---|---|
| 1.28 l | $HNO_3$ 68% |
| to 10 l | volume with $H_2O$ |

Zirconium basic carbonate is additioned to conc. $HNO_3$ under stirring, adding water whenever necessary to keep a clear solution. When almost all $2ZrO_2CO_2H_2O$ has been added, the temperature is increased to 60° C. in order to favour $CO_2$ evolution and during cooling the solution is brought to 10 l volume.

Sol preparation:

| 200 ml | zirconium solution in $H_2O$ (300 g/l as $ZrO_2$) |
|---|---|
| 240 g | cellulose methyl ether solution in $H_2O$ 2.5 % wt. |
| 5 ml | iso-octyl-phenoxy-polyethoxy-ethanol in $H_2O$ 10% wt. |
| to 500 ml | volume with $H_2O$ |

Viscosity at 25° C.:

| $D(sec.^{-1})$ | $\eta(Cp)$ |
|---|---|
| 54 | 80 |
| 420 | 70 |
| 1,170 | 57 |

Gelation bath composition:

concentrated ammonia (30% wt.) diluted 1:1 by volume with $H_2O$

Dripping apparatus:

7 capillaries (inner diameter=1.4 mm, outer diameter=2.0 mm) Ageing time: 30 min.; rinsing with water to pH=9; azeotropic drying in toluene; calcination schedule: 2K/min. up to the maximum temperature, then hold for 3 hours, cooling to room temperature.

Diameters of the spheres:

1.7±0.1 mm after drying, 1.4±0.1 mm after calcining at 300° C., 1.2±0.1 mm after calcining at 550° C.

The mechanical properties are reported in table I.

The crystallographic data are reported in table II.

The texture data are reported in table III.

From t-plots absence of microporosity is found.

EXAMPLE 2

Pure zirconia microspherical catalyst supports

Preparation of a zirconium solution in $H_2O$, with a formal concentration of 300 g/l as $ZrO_2$ and with $[NO_3]^-/[Zr^{4+}]$ ratio=0.8: as in example 1.

Sol preparation:

| 3472 ml | zirconium solution in $H_2O$ (300 g/l as $ZrO_2$) |
|---|---|
| 300 g | polyvinyl alcohol (molecular weight 100,000) |
| 200 ml | iso-octyl-phenoxy-polyethoxy-ethanol in $H_2O$ 10% wt. |
| to 10 l | volume with $H_2O$ |

Viscosity at 25° C.:

| $D(sec.^{-1})$ | $\eta(Cp)$ |
|---|---|
| 89 | 70 |
| 420 | 68 |
| 1,170 | 64 |

Gelation bath composition:

concentrated ammonia (30% wt.) diluted 1:2 by volume with $H_2O$

Dripping apparatus:

rotary cup atomizer, 12.000 rpm, flow rate: 2.5 l/h

Ageing time: 30 min.; rinsing with water to pH=9; single-step drying and calcination schedule: 2K/min. up to the maximum temperature, then hold for 3 hours, cooling to room temperature.

Diameters of the microspheres:

5–40 m after calcining at 350° C.

The texture data are reported in table IV.

From t-plots absence of microporosity is found.

EXAMPLE 3

Yttria (5.5% wt.)-partially stabilized zirconia catalyst supports

Preparation of a zirconium solution in $H_2O$, with a formal concentration of 300 g/l as $ZrO_2$ and with $[NO_3]^-/[Zr^{4+}]$ ratio=0.8: as in example 1.

Preparation of a yttrium solution in $H_2O$ with a formal concentration of 201 g/l as $Y_2O_3$:

201 g $Y_2O_3$ 99.9%

500 ml $HNO_3$ 68% diluted 1:1 by volume with $H_2O$ to 1 l volume with $H_2O$

Yttrium oxide is additioned to diluted $HNO_3$ under stirring at the temperature of 60° C. During cooling the solution is brought to 1 l volume.

Sol preparation:

| | |
|---|---|
| 189 ml | zirconium solution in $H_2O$ (300 g/l as $ZrO_2$) |
| 16.4 g | yttrium solution in $H_2O$ (201 g/l as $Y_2O_3$) |
| 240 g | cellulose methyl ether solution in $H_2O$ 2.5% wt. |
| 5 ml | iso-octyl-phenoxy-polyethoxy-ethanol in $H_2O$ 10% wt. |
| to 500 ml | volume with $H_2O$ |

Viscosity at 25° C.:
Similar to that of sol of example 1.
Gelation bath composition:
concentrated ammonia (30% wt.) diluted 1:1 by volume with $H_2O$
Dripping apparatus:
7 capillaries (inner diameter=1.4 mm , outer diameter=2.0 mm)
Ageing time: 30 min.; rinsing with water to pH=9; azeotropic drying in toluene; calcination schedule: 2K/min. up to the maximum temperature, then hold for 3 hours, cooling to room temperature.
Diameters of the spheres:
1.7±0.1 mm after drying, 1.4±0.1 mm after calcining at 300° C., 1.2±0.1 mm after calcining at 550° C.

EXAMPLE 4

Mixed-oxide zirconia-alumina(10% wt.) catalyst supports
Sol preparation:

| | | |
|---|---|---|
| 5.84 l | | zirconium solution in $H_2O$ (308 g/l as $ZrO_2$), prepared as in example 1. |
| 2 Kg | | waterdispersible alumina hydrate solution in $H_2O$ (10% wt. as $Al_2O_3$) |
| 5 Kg | | cellulose methyl ether solution in $H_2O$ 4% wt. |
| 0.2 l | | iso-octyl-phenoxy-polyethoxy-ethanol 10% wt. in $H_2O$ |
| to 20 l | | volume with $H_2O$ |

Viscosity at 25° C.:

| D(sec.$^{-1}$) | η(Cp) |
|---|---|
| 54 | 149 |
| 420 | 95 |
| 1,170 | 75 |

Gelation bath composition:
concentrated ammonia (30% wt.) diluted 1:1 by volume with $H_2O$
Dripping apparatus:
36 capillaries (inner diameter=4.0 mm , outer diameter= 6.0 mm)
Ageing time: 30 min.; rinsing with water to pH=9; single-step drying and calcination schedule: 2K/min. up to the maximum temperature, then hold for 3 hours, cooling to room temperature.
Diameters of the spheres:
1.7±0.1 mm after calcining at 450° C.
The mechanical properties, measured on smaller diameter spheres 1.4±0.1 mm prepared by the same dripping apparatus as in example 1, are reported in table V.
The texture data are reported in table VI.
From t-plots absence of microporosity is found.

EXAMPLE 5

Zirconia-alumina(10%)-copper oxide(8%) sorbent catalyst

Sol preparation:

| | |
|---|---|
| 96.5 ml | zirconium solution in $H_2O$ (343 g/l as $ZrO_2$), prepared as in example 1. |
| 36.8 g | waterdispersible alumina hydrate solution in $H_2O$ (10% wt. as $Al_2O_3$) |
| 48.6 ml | $Cu(NO_3)_2 3H_2O$ solution in $H_2O$ 200 g/l |
| 200 g | cellulose methyl ether solution in $H_2O$ 3% wt. |
| 5 ml | iso-octyl-phenoxy-polyethoxy-ethanol 10% wt. in $H_2O$ |
| to 500 ml | volume with $H_2O$ |

Gelation bath composition:
tetramethylammonium hydroxide solution 2.2M in methanol.
Dripping apparatus:
7 capillaries (inner diameter=1.4 mm , outer diameter=2.0 mm)
Ageing time: 30 min.; rinsing with water to pH=9-10; single-step calcination schedule: 2K/min. up to the maximum temperature, then hold for 3 hours, cooling to room temperature.
Diameters of the spheres:
1.2±0.1 mm after drying, 1.0±0.1 mm after calcining at 550° C.
In the attached FIG. 1 a near perfect close packing of the spheres is shown.

EXAMPLE 6

Zirconia-alumina(8.5%)-ceria(15%)-platinum (1.3%)-rhodium(0.3%) honeycomb washcoat
Preparation of zirconium acetate solution in $H_2O$ (368 g/l as $ZrO_2$):

| | |
|---|---|
| 888 g | $2ZrO_2 CO_2 H_2O$ |
| 460 ml | glacial acetic acid d = 1.05 g/ml |
| to 1 l | volume with $H_2O$ |

Dissolution is carried out under stirring and moderate heating to 50° C. in order to favour $CO_2$ evolution.
Sol preparation:

| | |
|---|---|
| 518 ml | zirconium acetate solution in $H_2O$ (368 g/l as $ZrO_2$) |
| 213 g | waterdispersible alumina hydrate solution in $H_2O$ (10% wt. as $Al_2O_3$) |
| 190 ml | $Ce(NO_3)_3 6H_2O$ in $H_2O$ 499 g/l |
| 5 g | polyvinyl alcohol (molecular weight 100,000) |
| 3.6 g | $H_2PtCl_6 6H_2O$ |
| 0.8 g | $Rh(NO_3)_3 2H_2O$ |
| to 1 l | volume with $H_2O$ |

The sol is pneumatically impregnated into a cordierite honeycomb of diameter 117 mm and heigth 76 mm with 64 channels/cm$^2$ (square cross section). Excess solution is blown away by air.
The sol is gelled putting the honeycomb into a cabinet with flowing gaseous ammonia, and then the honeycomb is dried and calcined at 500° C. for 3 hour.

EXAMPLE 7

Zirconia-alumina(7%)-ceria(30%) catalyst support
Sol preparation:

| | |
|---|---|
| 183.6 ml | zirconium solution in $H_2O$ (343 g/l as $ZrO_2$), prepared as in example 1. |
| 70 g | waterdispersible alumina hydrate solution in $H_2O$ (10% wt. as $Al_2O_3$) |

-continued

| | |
|---|---|
| 75.7 g | $Ce(NO_3)_3 \cdot 6H_2O$ |
| 250 g | cellulose methyl ether solution in $H_2O$ 4% wt. |
| 10 ml | iso-octyl-phenoxy-polyethoxy-ethanol 10% wt. in $H_2O$ |
| to 1 l | volume with $H_2O$ |

Gelation bath composition:

tetramethylammonium hydroxide solution 2.2M in methanol.

Dripping apparatus:

7 capillaries (inner diameter=2.3 mm, outer diameter=3.0 mm)

Ageing time: 30 min.; rinsing with water to pH=9; single-step drying and calcination schedule: 2K/min. up to the maximum temperature, then hold for 3 hours, cooling to room temperature.

Diameters of the spheres:

1.4±0.1 mm after drying, 1.2±0.1 mm after calcining at 800° C.

The texture data are reported in table VII.

From t-plots absence of microporosity is found.

TABLE I (example 1)
Single pellet crush strength (ASTM D 4179-88):

| Calcination Temperature (C.) | 300 | 450 | 550 |
|---|---|---|---|
| aver. crush strength [N] | 31.6 | 27.5 | 25.1 |
| standard deviation [N] | 9.8 | 11.0 | 5.5 |
| 80% spread [N] | 19.0–44.1 | 13.4–41.5 | 19.6–30.6 |
| 95% reliability [N] | 28.0–35.1 | 24.6–30.5 | 23.6–26.6 |
| Attrition resistance % A.I.F. (1) | — | 99.9 | — |

TABLE II (example 1)

| Calcination Temperature (C.) | 450 | 550 | 800 |
|---|---|---|---|
| tetragonal phase [%] | 20 | 15 | 1 |
| average crystallite size [nm] | 5.0 | 8.0 | — |
| monoclinic phase [%] | 80 | 85 | 99 |
| average crystallite size [nm] | 6.0 | 10.0 | 16.0 |

TABLE III (example 1)

| Calcination Temperature (C.) | 300 | 450 | 550 | 800 |
|---|---|---|---|---|
| Surface area ($m^2g^{-1}$) | 381 | 133 | 82 | 39 |
| Tot. pore vol. ($cm^3g^{-1}$) (2) | 0.57 | 0.35 | 0.36 | 0.11 |
| $r_p^{max}$(nm) (3) | 3.0 | 3.7 | 4.8 | 23.1 |

TABLE IV (example 2)

| Calcination Temperature (C.) | 350 |
|---|---|
| Surface area ($m^2g^{-1}$) | 263 |
| Tot. pore vol. ($cm^3g^{-1}$) (2) | 0.31 |
| $r_p^{max}$(nm) (3) | 1.8 |

TABLE V (example 4)
Single pellet crush strength (ASTM D 4179-88):

| Calcination Temperature (C.) | 550 |
|---|---|
| aver. crush strength [N] | 56.3 |
| standard deviation [N] | 29.4 |
| 80% spread [N] | 18.7–93.9 |
| 95% reliability [N] | 45.8–66.8 |
| Attrition resistance % A.I.F. (1) | 99.9 |

TABLE VI (example 4)

| Calcination Temperature (C.) | 550 |
|---|---|
| Surface area ($m^2g^{-1}$) | 201 |
| Tot. pore vol. ($cm^3g^{-1}$) (2) | 0.26 |
| $r_p^{max}$(nm) (3) | 1.9 |

TABLE VII (example 7)

| Calcination Temperature (C.) | 800 |
|---|---|
| Surface area ($m^2g^{-1}$) | 70 |
| Tot. pore vol. ($cm^3g^{-1}$) (2) | 0.13 |
| $r_p^{max}$(nm) (3) | 3.4 |

(1) Performed on 10 g of sample into an ampulla (72 mm length and 34 mm i.d.), displacement=40 mm, speed= 700 rpm. Expressed as the ratio between the weight of material remained above the sieve after the test and the original weight of the sample.

(2) Determined from the adsorption branch at $P/P_o=0.99$.

(3) The mesopore size distribution is unimodal with the pore radius centered around $r_p^{max}$ values.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A process for obtaining pure or mixed oxide zirconia spheres, microspheres or washcoats consisting of:

preparing a zirconium solution in water at a concentration, expressed as $ZrO_2$, or equal to or lower than 400 g/l, starting from a basic zirconium carbonate dissolved in concentrated nitric acid up to a molar ratio $(NO_3^-)/(Zr_4^+)$ of about 0.8, and optionally preparing at least one solution of other oxides;

preparing of a sol of zirconium, mixed with other metals, by a thickening agent and, optionally for spheres and microspheres, a surface active agent;

dripping the sol into an alkaline gelation bath for obtaining gel spheres or microspheres, or sucking the sol into honeycomb channels to obtain washcoats, with subsequent gelation with gaseous ammonia;

ageing the so obtained gel;

rinsing with water down to pH=9–10, only for gel spheres or microspheres; and drying and calcining.

2. A process according to claim 1) wherein the thickening agent is methylcellulose, hydroxypropyl methylcellulose, hydroxybutyl methylcellulose, a polyvinyl alcohol of molecular weight in the range 15,000–186,000, dextrin or dextran.

3. A process according to claim 1) wherein the gelation bath is made of water or alcoholic solutions of ammonia, hydrazine, hydroxylamine, hexamethylenetetramine, monoethanolamine, tetramethylammonium hydroxide, tetraethylammonium hydroxide, tetrabutylammonium hydroxide; or is made of gaseous ammonia.

4. A process according to claim 3) wherein the alcohol of the alcoholic solution is methyl-, ethyl-, n-propyl- or isopropyl alcohol.

5. A process according to claim 1) wherein the surface active agent is non ionic.

6. A process according to claim 5) wherein the non ionic surface active agent is iso-octyl-phenoxy-polyethoxyethanol.

7. A process according to claim 1) wherein the sol composition in terms of oxides is:

$ZrO_2$;

$ZrO_2$—$Y_2O_3$, with $Y_2O_3$ in the range 1–15% wt.;

$ZrO_2$—$Al_2O_3$, with $Al_2O_3$ in the range 1–30% wt.;

$ZrO_2$—$Al_2O_3$—CuO, with $Al_2O_3$ in the range 1–30% wt. and CuO in the range 1–20% wt.;

$ZrO_2$—$Al_2O_3$—$CeO_2$, with $Al_2O_3$ in the range 1–30% wt. and $CeO_2$ in the range 5–30% wt and containing a catalytically effective amount of rhodium and/or platinum and/or palladium.

8. A process according to claim 1) wherein the spheres have diameters between 5 mm and 0.5 mm.

9. A process according to claim 1) wherein the microspheres have diameters between 1 μm and 0.5 mm.

10. A process according to claim 1) wherein the washcoat has a thickness<200 μm.

11. Process according to claim 1, wherein the molar ratio is 0.8.

* * * * *